United States Patent
Jefremow et al.

(10) Patent No.: US 11,011,988 B1
(45) Date of Patent: May 18, 2021

(54) IMPLICIT ON-TIME REGULATED HYBRID CONVERTER

(71) Applicant: Dialog Semiconductor (UK) Limited, London (GB)

(72) Inventors: Mihail Jefremow, Augsburg (DE); Simon Stark, Munich (DE); Holger Petersen, Pastetten (DE); Fabio Rigoni, Karlsfeld (DE); Stephan Drebinger, Munich (DE); Alessandro Angeli, Munich (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/705,171

(22) Filed: Dec. 5, 2019

(51) Int. Cl.
  *H02M 3/158*  (2006.01)
  *H02M 7/483*  (2007.01)
  *H02M 1/00*  (2006.01)

(52) U.S. Cl.
  CPC .......... *H02M 3/158* (2013.01); *H02M 7/483* (2013.01); *H02M 2001/0003* (2013.01); *H02M 2007/4835* (2013.01)

(58) Field of Classification Search
  CPC ................ H02M 3/158; H02M 7/483; H02M 2007/4835
  USPC ............. 307/110; 323/282; 327/536; 363/60
  See application file for complete search history.

(56) References Cited

U.S. PATENT DOCUMENTS

| | | | |
|---|---|---|---|
| 9,559,589 B2 * | 1/2017 | Petersen | ............... H02M 3/158 |
| 2009/0278520 A1 | 11/2009 | Perreault | |
| 2014/0240034 A1 | 8/2014 | Myles | |
| 2017/0055322 A1 * | 2/2017 | Jiang | ....................... H02M 3/07 |
| 2017/0302093 A1 * | 10/2017 | Petersen | ............... H02M 3/158 |
| 2018/0166902 A1 | 6/2018 | Huang | |

(Continued)

OTHER PUBLICATIONS

"A Three-Level Single-Inductor Triple-Output Converter with an Adjustable Flying-Capacitor Technique for Low Output Ripple and Fast Transient Response," by Li-Cheng Chu et al., 2017 IEEE International Solid-State Circuits Conference (ISSCC), Feb. 5-9, 2017, pp. 186-188.

(Continued)

*Primary Examiner* — Gary A Nash
(74) *Attorney, Agent, or Firm* — Saile Ackerman LLC; Stephen B. Ackerman (57) ABSTRACT

A DC/DC power converter and a method to convert an input voltage into an output voltage are presented. The power converter may have a first flying capacitor, a second flying capacitor, an inductor, and switching elements. It may control the switching elements such that the switching elements establish a first magnetizing current path from the input node, via the first flying capacitor, via the second flying capacitor, via the inductor, to the output node. The converter may control the switching elements to interrupt said first magnetizing current path after a pre-determined time interval. The converter may control the switching elements such that the switching elements establish a demagnetizing current path from a reference potential via the inductor to the output node. The converter may control the switching elements such that said demagnetizing current path is interrupted when a current through the inductor reaches a pre-determined threshold current value.

26 Claims, 8 Drawing Sheets

(56) References Cited

U.S. PATENT DOCUMENTS

2018/0175726 A1* 6/2018 Petersen .......... H02M 3/33569
2018/0358896 A1 12/2018 Puggelli

OTHER PUBLICATIONS

"A 50MHz 5V 3W 90% Efficiency 3-Level Buck Converter with Real-Time Calibration and Wide Output Range for Fast-DVS in 65nm CMOS," by Xun Liu et al., 2016 IEEE Symposium on VLSI Circuits (VLSI-Circuits), Jun. 15-17, 2016, 2 pages.
"Zero Inductor Boltage Multilevel Bus Converter," by Samuel Webb et al., 2018 IEEE Applied Power Electronics Conference and Exposition (APEC), Mar. 4-8, 2018, pp. 2175-2182.
"A 2MHz 12-to-100V 90%-Efficiency Self-Balancing ZVS Three-Level DC-DC Regulator with Constant-Frequency AOT $V^2$ Control and 5ns ZVS Turn-On Delay," by Jung Xue et al., 2016 IEEE International Solid-State Circuits Conference (ISSCC), Jan. 31, 2016, pp. 226-228.
"Three-Level Buck Converter for Envelope Tracking in RF Power Amplifiers," by Vahid Yousefzadeh et al., Twentieth Annual IEEE Applied Power Electronics Conference and Exposition, 2005, APEC 2005, Mar. 6-10, 2005, pp. 1588-1594.
U.S. NOA, U.S. Appl. No. 16/705,176, First Named Inventor: Mark Mercer, dated Dec. 1, 2020, 15 pages.

* cited by examiner

IMPLICIT ON-TIME REGULATED HYBRID CONVERTER

TECHNICAL FIELD

The present document relates to DC (Direct Current)/DC power converters. In particular, the present document relates to multilevel power converters for regulating an output voltage with the help of two flying capacitors and one inductor.

BACKGROUND

Current practice is to use a conventional one level buck converter, which is based on an inductor/coil to convert an input voltage into an output voltage. The advantage of using an inductor-based power converter compared to capacitor-based power converters is the freedom to regulate the output voltage. Capacitor-based power converters would need to change the capacitor switching configuration in order to provide different output voltage levels.

Recent market trends in wearable devices (like e.g. ear-buds, watches, and fitness trackers), make it necessary to choose very small inductor footprints, and in particular very tiny vertical dimensions of the inductors. However, the small footprint is usually achieved by sacrificing the quality of the inductor. It can be shown that inductors with small footprint may substantially deteriorate the power efficiency of state-of-the-art buck converters.

There are new architectures called multilevel converters (MLC), such as e.g. multilevel buck converters, which may improve the power efficiency compared to conventional one level buck converters. Multilevel buck converters typically consist of two stages. A first stage may comprise one or more flying capacitors for dividing the input voltage by a certain division ratio. The divided input voltage is then used as a supply voltage for the second stage comprising an inductor-based power converter. The MLC architecture may achieve a substantial advantage in power efficiency in case the output voltage is close to the input voltage divided by the division ratio of the first stage. In this situation, the main power conversion is performed by the flying capacitor(s) and the inductor is just used to adjust the final output voltage. In this case, the power efficiency is much less dependent on coil quality and is more dependent on capacitor quality, which is much easier to realize for small sizes.

A main challenge in MLCs is to regulate the voltages over the flying capacitor(s) of the first stage, which requires control circuitry with substantial complexity, current consumption and circuit area. Another disadvantage of MLC architectures is that power efficiency is only improved compared to conventional one level power converters when the conversion ratio of the MLC (i.e. the ratio between the given input voltage and the desired output voltage) is similar to the division ratio of the first stage of the MLC. If, however, said conversion ratio significantly deviates from said division ratio, the power efficiency of the MLC may decrease. In particular, for very large or very small conversion ratios, the inductor needs to carry a big part of the conversion ratio and the MLC becomes more sensitive to the inductor quality again. Therefore, the power efficiency of the MLC may be similar to or worse than the power efficiency of a conventional one level power converter, depending on the required conversion ratio and the inductor quality.

SUMMARY

The present document addresses the above-mentioned technical problems. In particular, the present document addresses the technical problem of providing a multilevel power converter with improved power efficiency for all conversion ratios, with a novel approach for regulating the voltages over the flying capacitors, and with a reduced overall power consumption.

According to an aspect, a power converter is presented. The power converter may be configured to convert an input voltage at an input node into an output voltage at an output node. The power converter may comprise a first flying capacitor, a second flying capacitor, an inductor, and switching elements. The power converter may be configured to control, in a first magnetizing state, the switching elements such that the switching elements establish a first magnetizing current path from the input node, via the first flying capacitor, via the second flying capacitor, via the inductor, to the output node. The power converter may be configured to control, in said first magnetizing state, the switching elements such that the switching elements interrupt said first magnetizing current path after a pre-determined time interval. The power converter may be configured to control, in a demagnetizing state, the switching elements such that the switching elements establish a demagnetizing current path from a reference potential via the inductor to the output node. The power converter may be configured to control, in said demagnetizing state, the switching elements such that said demagnetizing current path is interrupted when a current through the inductor reaches a pre-determined threshold current value. For example, said pre-determined threshold current value may be 0A, i.e. the power converter may be configured to detect a zero crossing of the inductor current and may be configured to interrupt said demagnetizing current path upon detection of said zero crossing.

By magnetizing the inductor for a constant time period (i.e. the predetermined time interval) and demagnetizing the inductor until the pre-determined threshold current value is reached, an implicit regulation of the voltages over the first and the second flying capacitors may be achieved. In steady state operation, the voltage over the second flying capacitor may settle around a quarter of the input voltage, and the voltage over the first flying capacitor may settle around half of the input voltage. Therefore, no additional voltage regulation loops are required to regulate the latter voltages. Further, since the first magnetizing state is terminated after a constant time period, peak current detection circuits known from the prior art become dispensable. Moreover, the described power converter makes it possible to improve power efficiency compared to multilevel power converters known from the prior art.

Each of the switching elements may be implemented with any suitable device, such as, for example, a metal-oxide-semiconductor field effect transistor MOSFET, an insulated-gate bipolar transistor IGBT, a MOS-gated thyristor, or any other suitable power device. Each switching element may have a gate to which a respective driving voltage or control signal may be applied to turn the switching element on (i.e. to close the switching element) or to turn the switching element off (i.e. to open the switching element).

Throughout this document, the term "reference potential" is meant in its broadest possible sense. In particular, the reference potential is not limited to ground i.e. a reference potential with a direct physical connection to earth. Rather, the term "reference potential" may refer to any reference point to which and from which electrical currents may flow, or from which voltages may be measured. Moreover, it should be mentioned that the reference potentials mentioned in this document may not necessarily refer to the same physical contact. Instead, the reference potentials mentioned in this document may relate to different physical contacts although reference is made to "the" reference potential for ease of presentation.

In general, the first and second flying capacitor may be passive electronic components capable of storing electrical energy in an electric field. The capacitors may have different capacitance values or may have the same capacitance value. Each capacitor may comprise a first terminal and a second terminal. The capacitors are denoted as "flying" since, during certain switching states of the described power converter, said first and second terminals may not be driven to any defined logic voltage level, i.e. the terminals of said capacitors may be floating to arbitrary voltage values. In other words, the terminals of the capacitors may be high impedance nodes in certain switching states, with no or only a relatively small amount of current flowing through said terminals.

The skilled person will readily understand that the adjectives "magnetizing" and "demagnetizing" are used here to describe the purpose of the respective states and current paths. In the first magnetizing state, an increasing current may flow along the first magnetizing current path, resulting in an increasing magnetic field generated by the inductor. In other words, the inductor may be said to be "magnetized" during said first magnetizing state. The other way around, in the demagnetizing state, a decreasing current may flow along the demagnetizing current path, resulting in a corresponding reduction of the magnetic field. The inductor may be said to be "demagnetized" during the demagnetizing state.

The power converter may comprise a control unit configured to carry out the functional features of the power converter. That is, the power converter may comprise a control unit configured control the switching elements as described within this document. In particular, the control unit may be configured to switch between the different states and control the switching elements according to the currently selected state. As will be described in the following paragraphs, the control unit may be configured to receive control signals from e.g. a timer, a first comparator and a second comparator, and the control unit may be configured to make a decision with regard to the next state based on said control signals. The control unit may be implemented in a single, centralized control logic, or in a distributed manner in a plurality of interconnected control logics.

For example, the power converter may be configured to switch from the first magnetizing state to the demagnetizing state after said pre-determined time interval has lapsed in the first magnetizing state. Specifically, the power converter may be configured to interrupt said magnetizing current path after said time interval by immediately switching to the demagnetizing state and establishing said demagnetizing current path.

The power converter may comprise a first comparator configured to compare the output voltage at the output node with a reference voltage. The power converter may be configured to enter the first magnetizing state based on the comparison. For example, the comparator may be configured to indicate when the output voltage reaches or falls below the reference voltage. The power converter may be configured to leave, when the comparator indicates that the output voltage reaches or falls below the reference voltage, an idle state during which no current is flowing through the inductor and enter the first magnetizing state. As already described above, the power converter may then be configured to control, in the first magnetizing state, the switching elements such that the switching elements establish the above-described first magnetizing current path from the input node, via the first flying capacitor, via the second flying capacitor, via the inductor, to the output node. Again, the power converter may be configured to control, in said first magnetizing state, the switching elements such that the switching elements interrupt said first magnetizing current path after the pre-determined time interval.

The power converter may comprise a timer configured to generate a signal upon expiry of said pre-determined time interval. The power converter may be configured to interrupt, in said first magnetizing state, the first magnetizing current based on said signal.

The power converter may comprise a second comparator configured to compare, in the demagnetizing state, (a voltage indicative of) the current through the inductor (with a pre-determined threshold voltage value associated) with said pre-determined threshold current value. The power converter may be configured to interrupt, in the demagnetizing state, the demagnetizing current path based on the comparison. For example, the pre-determined threshold current value may be 0 A, the pre-determined threshold voltage value may be 0V, and the voltage indicative of the current through the inductor may be obtained by tapping an arbitrary node on the demagnetizing current path.

The power converter may be configured to control, in a second magnetizing state, the switching elements such that the switching elements establish a second magnetizing current path from a reference potential, via the second flying capacitor, via the inductor, to the output node. The power converter may be configured to control, in said second magnetizing state, the switching elements such that the switching elements interrupt said second magnetizing current path after said pre-determined time interval.

The above-mentioned timer may be configured to generate a signal upon expiry of the pre-determined time interval in the second magnetizing state, and the power converter may be configured to interrupt, in said second magnetizing state, the second magnetizing current based on the signal generated by said timer. The power converter may be configured to switch from the second magnetizing state to the demagnetizing state after said pre-determined time interval has lapsed in the second magnetizing state.

The power converter may be configured to control, in a third magnetizing state, the switching elements such that the switching elements establish a third magnetizing current path from a reference potential, via the first flying capacitor, via the second flying capacitor, via the inductor, to the output node. The power converter may be configured to control, in said third magnetizing state, the switching elements such that the switching elements interrupt said third magnetizing current path after said pre-determined time interval.

Again, the above-mentioned timer may be configured to generate a signal upon expiry of a pre-determined time interval in the third magnetizing state, and the power converter may be configured to interrupt, in said third magnetizing state, the third magnetizing current based on the signal generated by said timer. The power converter may be configured to switch from the third magnetizing state to the demagnetizing state after said pre-determined time interval has lapsed in the third magnetizing state.

The power converter may be configured to switch, after the current through the inductor reaches said pre-determined threshold current value in the demagnetizing state, to an idle state. The power converter may be configured to control, in said idle state, the switching elements such that no current is flowing through the inductor. Hence, it may be said that the described power converter is configured to operate in discontinuous conduction mode (DCM, also known as discontinuous current mode). During the idle state, some or all the switching elements may be open. Moreover, the control unit which is configured to control the switching behaviour of the switching elements may be turned off, and only the first comparator may be active, thereby reducing the power consumption of the power converter during the idle state.

The power converter may comprise the first comparator configured to compare the output voltage at the output node with a reference voltage, and the power converter may be configured to switch from the idle state to the third magnetizing state based on the comparison.

The power converter may be configured to switch between the different states according to the following ordered state sequence: the first magnetizing state; the demagnetizing state; the second magnetizing state; the demagnetizing state; (the idle state;) the third magnetizing state; the demagnetizing state; the second magnetizing state; the demagnetizing state (; the idle state). Idle states may be inserted following each or a subset of the demagnetizing states.

More specifically, the power converter may be configured to switch from the first magnetizing state to the demagnetizing state when the pre-determined time interval expires. The power converter may be configured to switch from the demagnetizing state to the second magnetizing state (or first to the idle state and then to the second magnetizing state) when the current through the inductor falls below the pre-determined threshold current value. The power converter may be configured to switch from the second magnetizing state to the demagnetizing state when the pre-determined time interval expires. The power converter may be configured to switch from the demagnetizing state to the idle state when the current through the inductor falls below the pre-determined threshold current value. The power converter may be configured to switch from the idle state to the third magnetizing state when the output voltage at the output node falls below the reference voltage. Alternatively, the idle state may be skipped. The power converter may be configured to switch from the third magnetizing state to the demagnetizing state when the pre-determined time interval expires. The power converter may be configured to switch from the demagnetizing state to the second magnetizing state (or first to the idle state and then to the second magnetizing state) when the current through the inductor falls below the pre-determined threshold current value. The power converter may be configured to switch from the second magnetizing state to the demagnetizing state when the pre-determined time interval expires. The power converter may be configured to switch from the demagnetizing state to the idle state when the current through the inductor falls below the pre-determined threshold current value. Finally, the power converter may be configured to switch from the idle state back to the first magnetizing state when the output voltage at the output node falls below the reference voltage. Alternatively, the idle state may be skipped.

The switching elements may comprise a first switching element coupled between the input node and a first terminal of the first flying capacitor, a second switching element coupled between a second terminal of the first flying capacitor and first terminal of the second flying capacitor, and a sixth switching element coupled between a second terminal of the second flying capacitor and a first terminal of the inductor. The power converter may be configured to establish, in the first magnetizing state, the first magnetizing current path using the first, the second and the sixth switching element. A second terminal of the inductor may be coupled to the output node of the power converter.

The switching elements may comprise a fifth switching element coupled between a first terminal of the second flying capacitor and a first terminal of the inductor, and a seventh switching element coupled between a reference potential and a second terminal of the second flying capacitor. The power converter may be configured to establish, in the second magnetizing state, the second magnetizing current path using the fifth and the seventh switching element.

The switching elements may comprise a third switching element coupled between a reference potential and a second terminal of the first flying capacitor, a fourth switching element coupled between a first terminal of the first flying capacitor and first terminal of the second flying capacitor. The power converter may be configured to establish, in the third magnetizing state, the third magnetizing current path using the third, the fourth and the sixth switching element.

The switching elements may comprise a seventh switching element coupled between a second terminal of the second flying capacitor and a reference potential. The power converter may be configured to establish, in the demagnetizing state, the demagnetizing current path using the sixth and the seventh switching element.

According to another aspect, a method for operating a power converter is described. The method may comprise steps which correspond to the features of the power converter described in the present document. In particular, the method may be suitable for operating a power converter which is configured to convert an input voltage at an input node into an output voltage at an output node. The power converter may comprise a first flying capacitor, a second flying capacitor, an inductor, and switching elements. The method may comprise controlling, in a first magnetizing state, the switching elements such that the switching elements establish a first magnetizing current path from the input node, via the first flying capacitor, via the second flying capacitor, via the inductor, to the output node. The method may comprise controlling, in said first magnetizing state, the switching elements such that the switching elements interrupt said first magnetizing current path after a pre-determined time interval. The method may comprise controlling, in a demagnetizing state, the switching elements such that the switching elements establish a demagnetizing current path from a reference potential via the inductor to the output node. The method may comprise controlling, in said demagnetizing state, the switching elements such that said demagnetizing current path is interrupted when a current through the inductor reaches a pre-determined threshold current value.

The power converter may comprise a first comparator configured to compare the output voltage at the output node with a reference voltage. The method may comprise entering the first magnetizing state based on the comparison.

The power converter may comprise a timer configured to generate a signal upon expiry of said pre-determined time interval. The method may comprise interrupting, in said first magnetizing state, the first magnetizing current based on said signal.

The power converter may comprise a second comparator configured to compare, in the demagnetizing state, (a voltage indicative of) the current through the inductor with (a pre-determined threshold voltage value associated with) said pre-determined threshold current value. The method may comprise interrupting, in the demagnetizing state, the demagnetizing current path based on the comparison.

The method may comprise controlling, in a second magnetizing state, the switching elements such that the switching elements establish a second magnetizing current path from a reference potential, via the second flying capacitor, via the inductor, to the output node. The method may comprise controlling, in said second magnetizing state, the switching elements such that the switching elements interrupt said second magnetizing current path after said predetermined time interval.

The method may comprise controlling, in a third magnetizing state, the switching elements such that the switching elements establish a third magnetizing current path from a reference potential, via the first flying capacitor, via the second flying capacitor, via the inductor, to the output node. The method may comprise controlling, in said third magnetizing state, the switching elements such that the switching elements interrupt said third magnetizing current path after said pre-determined time interval.

The method may comprise switching, after the current through the inductor reaches said pre-determined threshold current value in the demagnetizing state, to an idle state. The method may comprise controlling, in said idle state, the switching elements such that no current is flowing through the inductor.

The power converter may comprise a first comparator configured to compare the output voltage at the output node with a reference voltage. The method may comprise switching from the idle state to the third magnetizing state based on the comparison. In general, idle states may be randomly inserted after each demagnetizing state.

The method may comprise switching between the different states according to the following ordered state sequence: the first magnetizing state; the demagnetizing state; the second magnetizing state; the demagnetizing state; the idle state; the third magnetizing state; the demagnetizing state; the second magnetizing state; the demagnetizing state; the idle state. Again, idle states may be randomly inserted after each demagnetizing state.

The switching elements may comprise a first switching element coupled between the input node and a first terminal of the first flying capacitor, a second switching element coupled between a second terminal of the first flying capacitor and first terminal of the second flying capacitor, and a sixth switching element coupled between a second terminal of the second flying capacitor and a first terminal of the inductor. The method may comprise establishing, in the first magnetizing state, the first magnetizing current path by closing the first, the second and the sixth switching element.

The switching elements may comprise a fifth switching element coupled between a first terminal of the second flying capacitor and a first terminal of the inductor, and a seventh switching element coupled between a reference potential and a second terminal of the second flying capacitor. The method may comprise establishing, in the second magnetizing state, the second magnetizing current path by closing the fifth and the seventh switching element.

The switching elements may comprise a third switching element coupled between a reference potential and a second terminal of the first flying capacitor, a fourth switching element coupled between a first terminal of the first flying capacitor and first terminal of the second flying capacitor. The method may comprise establishing, in the third magnetizing state, the third magnetizing current path by closing the third, the fourth and the sixth switching element.

The switching elements may comprise a seventh switching element coupled between a second terminal of the second flying capacitor and a reference potential. The method may comprise establishing, in the demagnetizing state, the demagnetizing current path by closing the sixth and the seventh switching element.

According to a further aspect, a software program is described. The software program may be adapted for execution on a processor and for performing the method steps outlined in the present document when carried out by the processor. The processer may form part of the described control unit.

According to another aspect, a storage medium is described. The storage medium may comprise a software program adapted for execution on a processor and for performing the method steps outlined in the present document when carried out by the processor.

According to a further aspect, a computer program product is described. The computer program product may comprise instructions for performing the method steps outlined in the present document when carried out by the processor.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple", "connect", "coupled" or "connected" refers to elements being in electrical communication with each other, whether directly connected e.g., via wires, or in some other manner.

BRIEF DESCRIPTION OF THE DRAWINGS

The present invention is illustrated by way of example, and not by way of limitation, in the figures of the accompanying drawings in which like reference numerals refer to similar or identical elements, and in which.

DESCRIPTION

Figure 1:
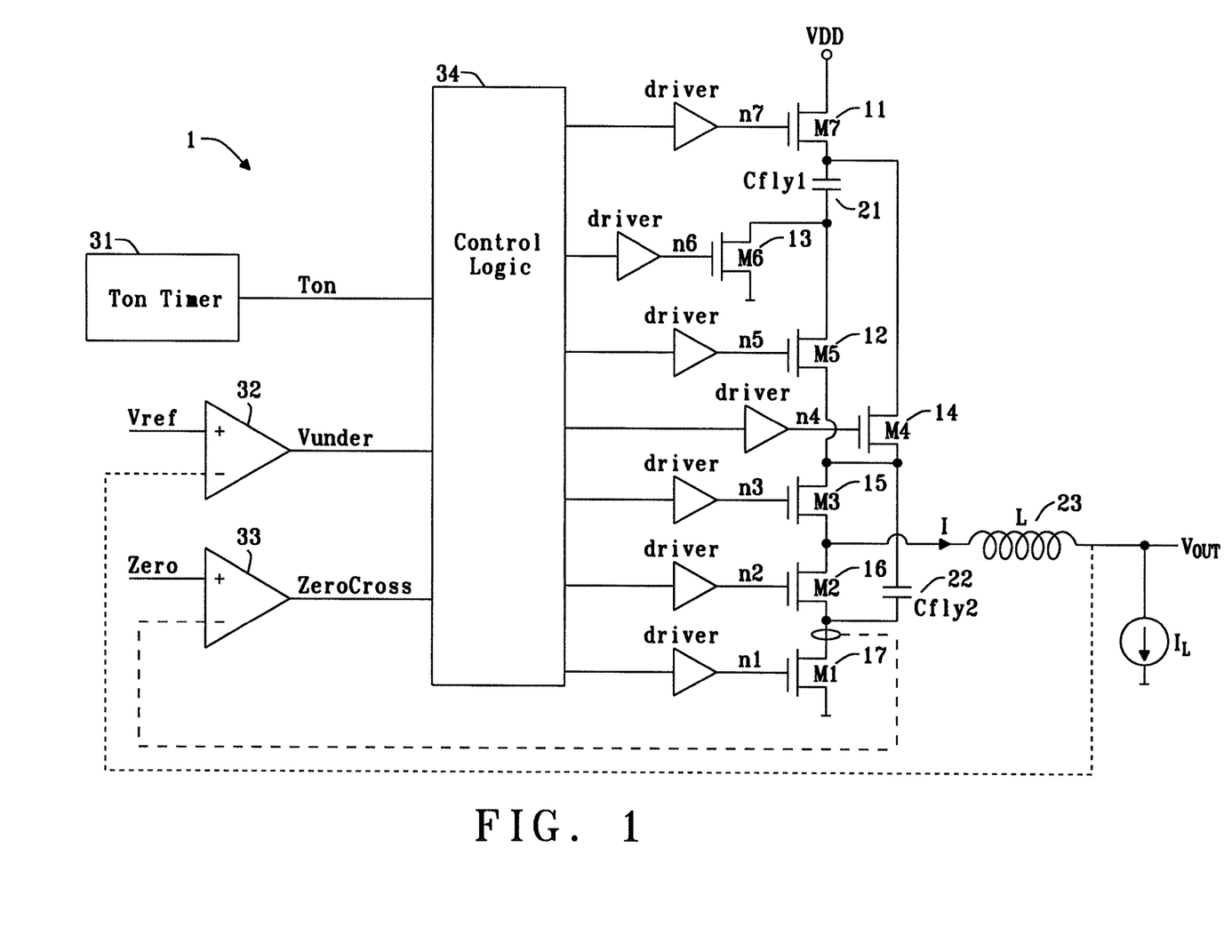
FIG. 1 shows an exemplary multilevel power converter.

This invention proposes a new design of a hybrid converter architecture utilizing a capacitor-based DC-DC divider and a coil-based buck converter in a combined architecture. FIG. 1 shows an exemplary multilevel power converter 1 according to the teachings of the present document. The exemplary power converter 1 comprises a first switching element 11 (M7), a second switching element 12 (M5), a third switching element 13 (M6), a fourth switching element 14 (M4), a fifth switching element 15 (M3), a sixth switching element 16 (M2), a seventh switching element 17

(M1), a first flying capacitor 21 (Cfly1), a second flying capacitor 22 (Cfly2), an inductor 23 (L), an on-time Ton timer 31, an under voltage comparator 32 (first comparator), a zero-cross comparator 33 (second comparator), a control logic 34 and a plurality of driver circuits for driving the switching elements 11-17.

For example, the fifth switching element 15 (M3), the sixth switching element 16 (M2), and the seventh switching element 17 (M1) may be devices with reduced low voltage rating in order to increase power efficiency.

Figure 2:
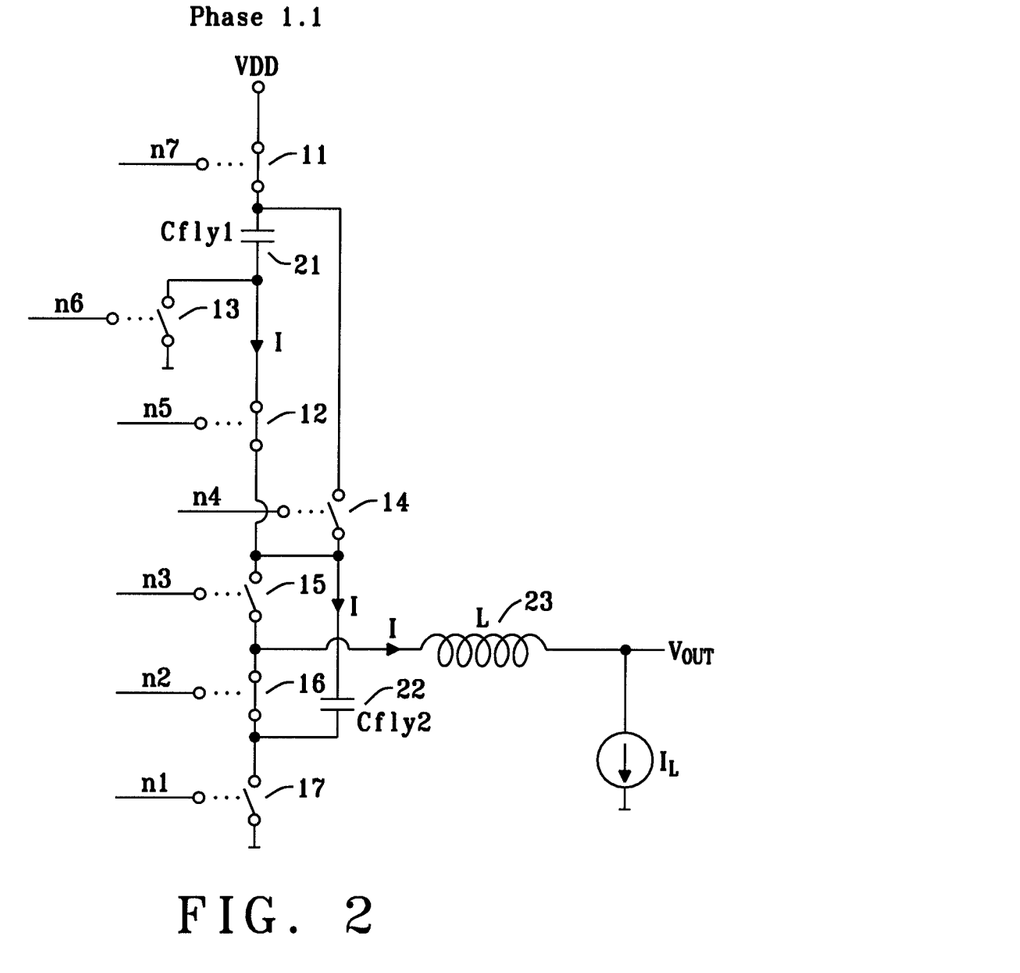
FIG. 2 shows a first magnetizing state of the exemplary power converter.

FIG. 2 shows a first magnetizing state (denoted as phase 1.1) of the exemplary power converter 1. The control logic 34 controls the switching elements such that the switching elements establish a first magnetizing current path from the input node, via the first flying capacitor 21, via the second flying capacitor 22, via the inductor 23, to the output node. In particular, the control logic 34 establishes the first magnetizing current path using the first 11, the second 12 and the sixth 16 switching element. In FIG. 2, the latter switching elements are assumed to be turned on. The remaining switching elements 13, 14, 15, and 17 are assumed to be turned off. During this state, the inductor 23 is magnetized and both flying capacitors 21 and 22 are charged.

Figure 3:
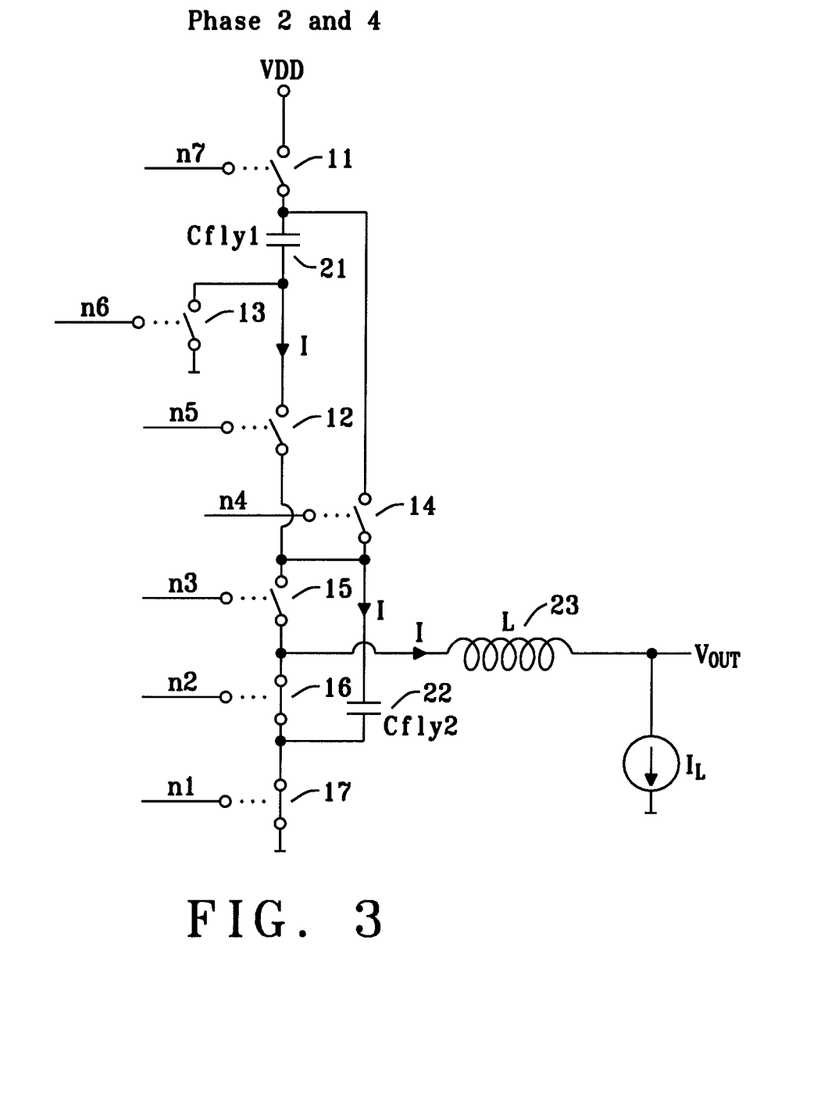
FIG. 3 shows a demagnetizing state of the exemplary power converter.

FIG. 3 shows a demagnetizing state (denoted as phase 2 and 4) of the exemplary power converter 1. The control logic 34 controls the switching elements such that the switching elements establish a demagnetizing current path from a reference potential via the inductor 23 to the output node. In particular, the control logic 34 establishes the demagnetizing current path using the sixth 16 and the seventh 17 switching element. In FIG. 3, the latter switching elements are assumed to be turned on. The remaining switching elements 11, 12, 13, 14 and 15 are assumed to be turned off. During this state, the inductor 23 is demagnetized and the voltages across the flying capacitors 21 and 22 remain unchanged.

Figure 4:
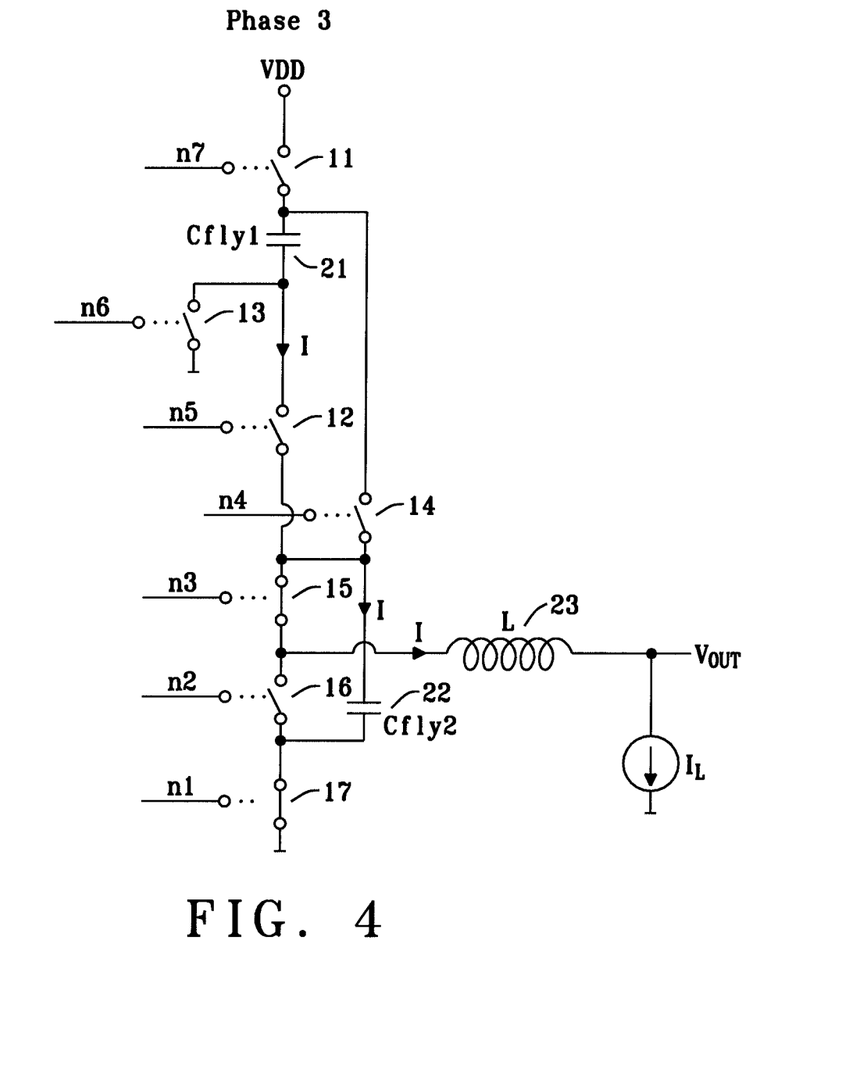
FIG. 4 shows a second magnetizing state of the exemplary power converter.

FIG. 4 shows a second magnetizing state (denoted as phase 3) of the exemplary power converter 1. The control logic 34 controls the switching elements such that the switching elements establish a second magnetizing current path from a reference potential, via the second flying capacitor 22, via the inductor 23, to the output node. In particular, the control logic 34 establishes the second magnetizing current path using the fifth 15 and the seventh 17 switching element. In FIG. 4, the latter switching elements are assumed to be turned on. The remaining switching elements 11, 12, 13, 14 and 16 are assumed to be turned off. During this state, the inductor 23 is magnetized, the second flying capacitor 22 is discharged, and the voltage across the first flying capacitors 21 remains unchanged.

Figure 5:
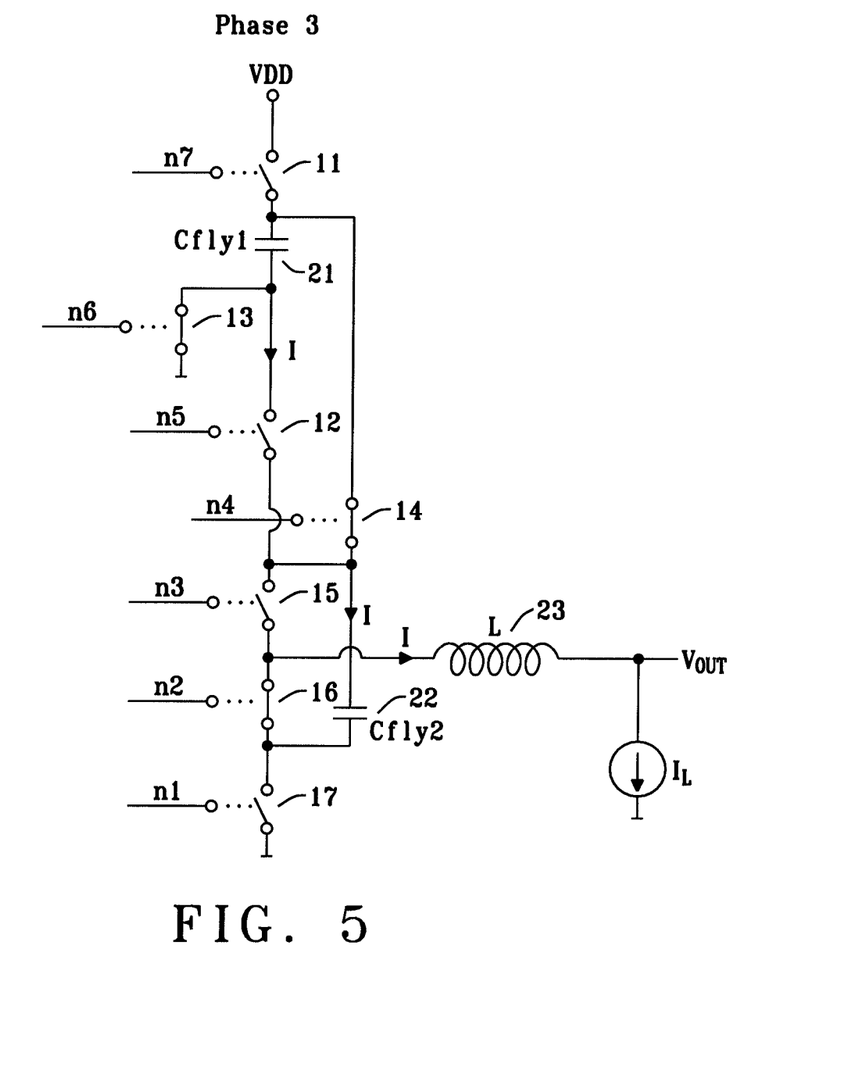
FIG. 5 shows a third magnetizing state of the exemplary power converter.

FIG. 5 shows a third magnetizing state (denoted as phase 2.1) of the exemplary power converter 1. The control logic 34 controls the switching elements such that the switching elements establish a third magnetizing current path from a reference potential, via the first flying capacitor 21, via the second flying capacitor 22, via the inductor 23, to the output node. In particular, the control logic 34 establishes the third magnetizing current path using the third 13, the fourth 14 and the sixth 16 switching element. In FIG. 5, the latter switching elements are assumed to be turned on. The remaining switching elements 11, 12, 15, and 17 are assumed to be turned off. During this state, the inductor 23 is magnetized, the first flying capacitor 21 is discharged, and the second flying capacitors 22 is charged.

Figure 6:
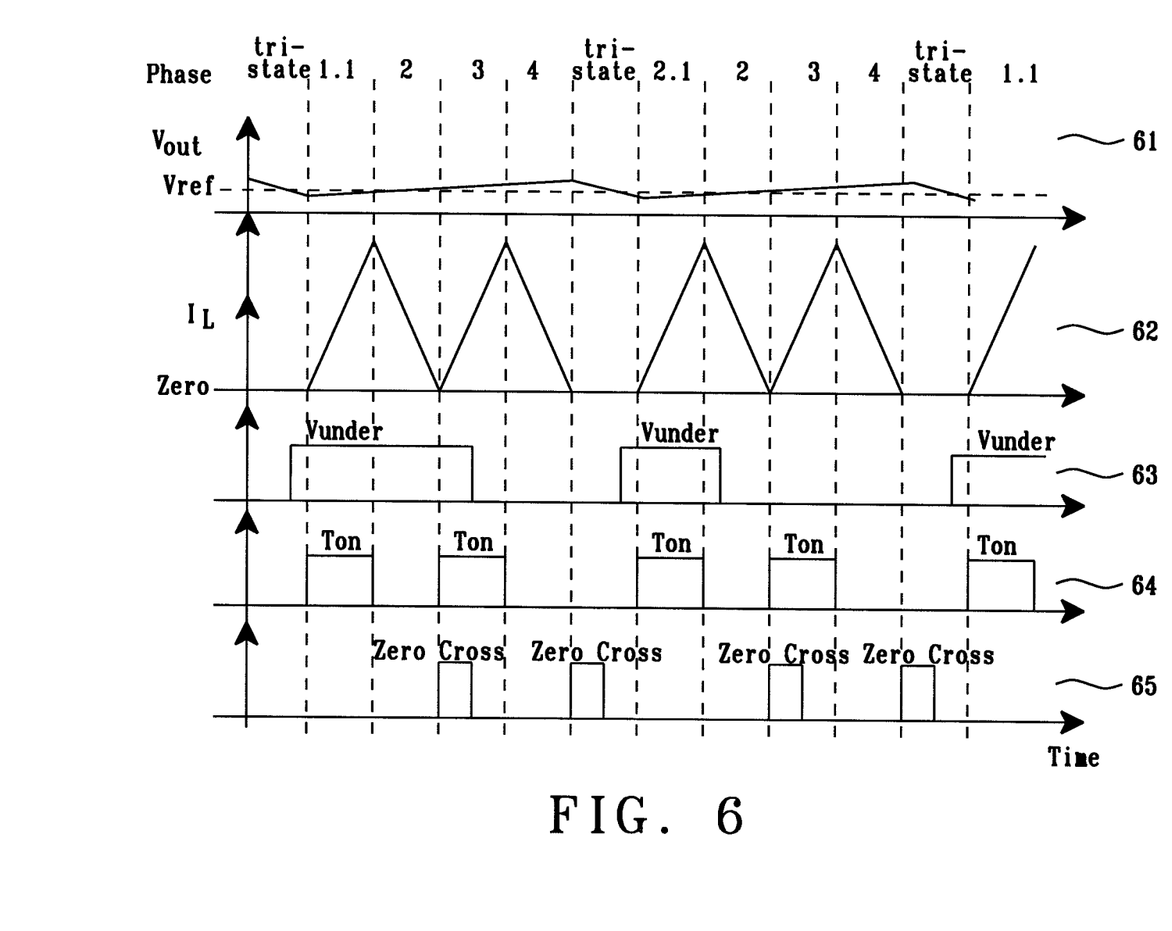
FIG. 6 shows an exemplary state sequence and signal waveforms of the exemplary power converter.

FIG. 6 shows an exemplary state sequence and signal waveforms of the exemplary power converter 1. A first diagram 61 illustrates the exemplary state sequence over time. The state sequence begins with a tri-state phase, followed by phases 1.1, 2, 3, and 4. Subsequently, the power converter 1 switches to another tri-state phase, followed by phases 2.1, 2, 3, and 4. A tri-state phase following a phase 4 may be skipped. Tri-state phases may also be inserted following each or one of the phases 2. In the tri-state phase (idle state), no current flows through the inductor 23. For example, in the tri-state phase, all switching elements may be open. At least switching elements 16 and 17 should be open. In the tri-state, all blocks except the under-voltage comparator 32 may be powered down, resulting in a low quiescent current $I_q$ of the power converter 1 during the tri-state phase.

A second diagram 62 illustrates the coil current over time. A third diagram 63 illustrates the output signal generated by the under-voltage comparator 32. After the output signal is triggered, indicating an output voltage lower than a reference voltage, the power converter begins switching through the phases 1.1, 2, 3, and 4. At this, phases 1.1 and 3 have a predetermined duration which is determined by the timer 31, see diagram 64. Further, the end of phases 2 and 4 is determined by the output signal generated by the zero-cross comparator 33, see diagram 65.

The second tri-state phase ends when the under-voltage comparator 32 indicates a low output voltage at the output node of the power converter 1. The power converter then switches through the phases 2.1, 2, 3, and 4. As already mentioned above, the power converter may also switch to the tri-state phase between phases 2 and 3, resulting in the alternative phase sequence 2.1, 2, tri-state, 3, and 4. Again, at the end of the tri-state phase, the under voltage comparator 32 may indicate a low output voltage at the output node of the power converter 1, thereby triggering the transition to phase 3. At this, phases 2.1 and 3 have a predetermined duration which is determined by the timer 31, see diagram 64. The duration of phases 2 and 4 is again determined by the output signal generated by the zero-cross comparator 33, see diagram 65.

Figure 7:
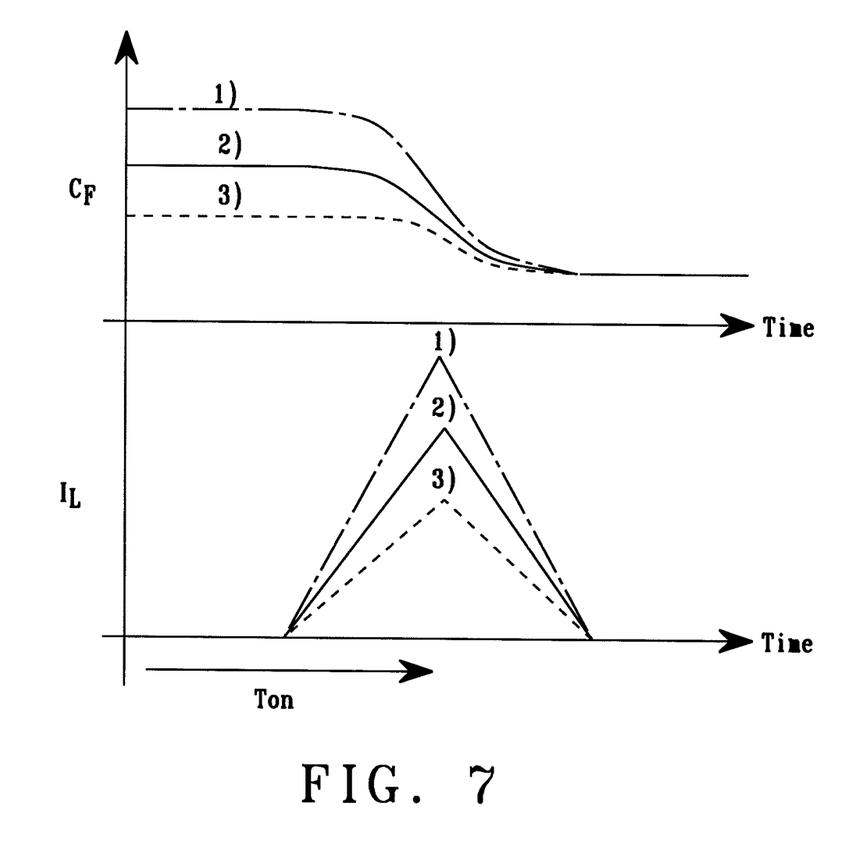
FIG. 7 shows exemplary flying capacitor voltages and coil currents.

FIG. 7 shows exemplary flying capacitor voltages and coil currents for explaining the implicit Ton regulation principle. The coil current in the power converter 1 depends on the voltage potential on the flying capacitors. If the voltage $C_F$ over the flying capacitor is higher than its desired value, the overall charge taken out of the flying capacitor after one pulse (see case 1)) is higher compared to a case where the voltage $C_F$ is at its desired voltage (see case 2)), which is defined by the power converter architecture. By doing this, the voltage $C_F$ will approach its desired value for the next pulse. Correspondingly, in case the voltage of the flying capacitor is lower compared to its desired voltage (see case 3)), the reduced peak in the coil current will lead to less drop of the flying capacitor voltage compared to the desired case. Thus, there is a negative feedback to the desired voltage on the flying capacitor voltages due to implicit Ton regulation.

Figure 8:
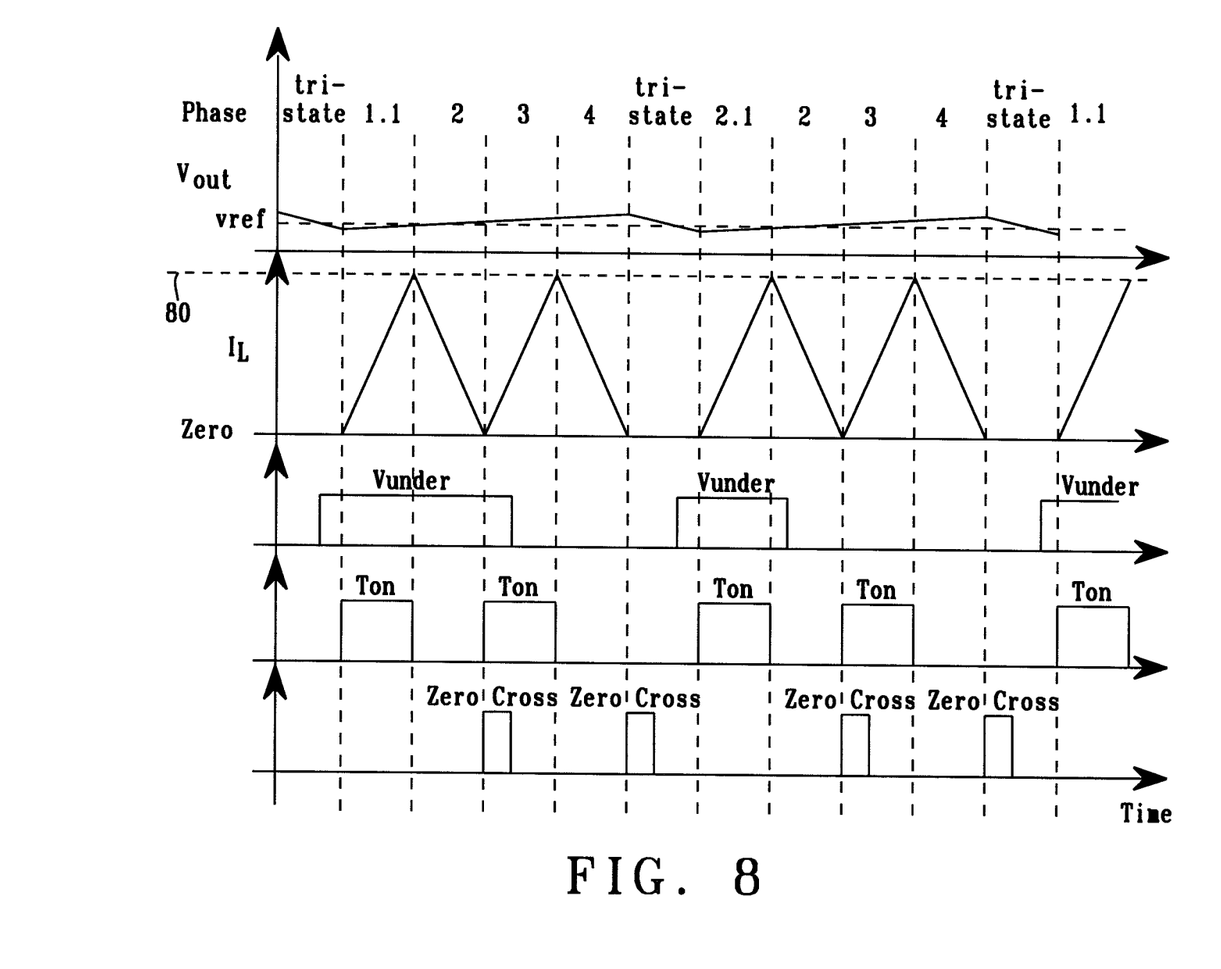
FIG. 8 shows an exemplary state sequence and signal waveforms of the exemplary power converter.

FIG. 8 shows an exemplary state sequence and signal waveforms of the exemplary power converter. Steady state operation of the power converter 1 is reached if the peak current of the coil current stays the same for phases 1.1, 3 and 2.1 (and the coil current goes e.g. to zero level after each pulse). The time interval Ton has the same duration during phases 1.1, 2.1, and 3. The peak current of the coil current is indicated by line 80 in FIG. 8.

For phases 2.1 and 3, in steady state, the following equations hold:

$$(V\text{cfly1} - V\text{cfly2} - V\text{out})/L * \text{Ton} = (V\text{cfly2} - V\text{out})/L * \text{Ton}$$

$$2 * V\text{cfly2} = V\text{cfly1}$$

In the above equation, Vcfly1 denotes the voltage over the first flying capacitor, Vcfly2 denotes the voltage over the second flying capacitor, Vout denotes the output voltage at the output node of the power converter 1, L denotes the inductivity of the inductor, Ton denotes the pre-determined time interval (i.e. the duration of phases 1.1, 2.1, and 3). For phases 1.1 and 3, in steady state, the following equations holds:

$$(VDD-Vcfly1-Vcfly2-Vout)/L*Ton=(Vcfly2-Vout)/L*Ton$$

In the above equation, VDD denotes the input voltage at the input node of the power converter 1. Combining the above equations yields:

$$Vcfly2=¼VDD$$

and $$Vcfly1=½VDD.$$

Therefore, the flying capacitor voltages may be automatically regulated to their desired values.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter configured to convert an input voltage at an input node into an output voltage at an output node, wherein the power converter comprises a first flying capacitor, a second flying capacitor, an inductor, and switching elements, wherein the power converter is configured
    to control, in a first magnetizing state, the switching elements such that the switching elements establish a first magnetizing current path from the input node, via the first flying capacitor, via the second flying capacitor, via the inductor, to the output node,
    to control, in said first magnetizing state, the switching elements such that the switching elements interrupt said first magnetizing current path after a pre-determined time interval,
    to control, in a demagnetizing state, the switching elements such that the switching elements establish a demagnetizing current path from a reference potential via the inductor to the output node, and
    to control, in said demagnetizing state, the switching elements such that said demagnetizing current path is interrupted when a current through the inductor reaches a pre-determined threshold current value.

2. The power converter of claim 1, wherein the power converter comprises a first comparator configured to compare the output voltage at the output node with a reference voltage, and wherein the power converter is configured
    to enter the first magnetizing state based on the comparison.

3. The power converter of claim 1, comprising a timer configured to generate a signal upon expiry of said pre-determined time interval, and wherein the power converter is configured to interrupt, in said first magnetizing state, the first magnetizing current based on said signal.

4. The power converter of claim 1, comprising a second comparator configured to compare, in the demagnetizing state, the current through the inductor with said pre-determined threshold current value, and wherein the power converter is configured to interrupt, in the demagnetizing state, the demagnetizing current path based on the comparison.

5. The power converter of claim 1, wherein the power converter is configured
    to control, in a second magnetizing state, the switching elements such that the switching elements establish a second magnetizing current path from a reference potential, via the second flying capacitor, via the inductor, to the output node,
    to control, in said second magnetizing state, the switching elements such that the switching elements interrupt said second magnetizing current path after said pre-determined time interval.

6. The power converter of claim 5, wherein the power converter is configured
    to control, in a third magnetizing state, the switching elements such that the switching elements establish a third magnetizing current path from a reference potential, via the first flying capacitor, via the second flying capacitor, via the inductor, to the output node,
    to control, in said third magnetizing state, the switching elements such that the switching elements interrupt said third magnetizing current path after said pre-determined time interval.

7. The power converter of claim 6, wherein the power converter is configured
    to switch, after the current through the inductor reaches said pre-determined threshold current value in the demagnetizing state, to an idle state, and
    to control, in said idle state, the switching elements such that no current is flowing through the inductor.

8. The power converter of claim 7, wherein the power converter comprises a first comparator configured to compare the output voltage at the output node with a reference voltage, and wherein the power converter is configured
    to switch from the idle state to the third magnetizing state based on the comparison.

9. The power converter of claim 8, wherein the power converter is configured to switch between the different states according to the following ordered state sequence:
    the first magnetizing state;
    the demagnetizing state;
    the second magnetizing state;
    the demagnetizing state;
    the third magnetizing state;
    the demagnetizing state;
    the second magnetizing state;
    the demagnetizing state.

10. The power converter of claim 6, wherein the switching elements comprise
    a third switching element coupled between a reference potential and a second terminal of the first flying capacitor,
    a fourth switching element coupled between a first terminal of the first flying capacitor and first terminal of the second flying capacitor, and
    a sixth switching element coupled between a second terminal of the second flying capacitor and a first terminal of the inductor, wherein the power converter is configured to establish, in the third magnetizing state, the third magnetizing current path using the third, the fourth and the sixth switching element.

11. The power converter of claim 5, wherein the switching elements comprise
a fifth switching element coupled between a first terminal of the second flying capacitor and a first terminal of the inductor, and
a seventh switching element coupled between a reference potential and a second terminal of the second flying capacitor,
wherein the power converter is configured to establish, in the second magnetizing state, the second magnetizing current path using the fifth and the seventh switching element.

12. The power converter of claim 1, wherein the switching elements comprise
a first switching element coupled between the input node and a first terminal of the first flying capacitor,
a second switching element coupled between a second terminal of the first flying capacitor and first terminal of the second flying capacitor, and
a sixth switching element coupled between a second terminal of the second flying capacitor and a first terminal of the inductor,
wherein the power converter is configured to establish, in the first magnetizing state, the first magnetizing current path using the first, the second and the sixth switching element.

13. The power converter of claim 1, wherein the switching elements comprise
a sixth switching element coupled between a second terminal of the second flying capacitor and a first terminal of the inductor, and
a seventh switching element coupled between a second terminal of the second flying capacitor and a reference potential,
wherein the power converter is configured to establish, in the demagnetizing state, the demagnetizing current path using the sixth and the seventh switching element.

14. A method of operating a power converter, wherein the power converter converts an input voltage at an input node into an output voltage at an output node, wherein the power converter comprises a first flying capacitor, a second flying capacitor, an inductor, and switching elements, wherein the method comprises
controlling, in a first magnetizing state, the switching elements such that the switching elements establish a first magnetizing current path from the input node, via the first flying capacitor, via the second flying capacitor, via the inductor, to the output node,
controlling, in said first magnetizing state, the switching elements such that the switching elements interrupt said first magnetizing current path after a pre-determined time interval,
controlling, in a demagnetizing state, the switching elements such that the switching elements establish a demagnetizing current path from a reference potential via the inductor to the output node, and
controlling, in said demagnetizing state, the switching elements such that said demagnetizing current path is interrupted when a current through the inductor reaches a pre-determined threshold current value.

15. The method of claim 14, wherein the power converter comprises a first comparator to compare the output voltage at the output node with a reference voltage, and wherein the method comprises
entering the first magnetizing state based on the comparison.

16. The method of claim 14, wherein the power converter comprises a timer to generate a signal upon expiry of said pre-determined time interval, and wherein the method comprises
interrupting, in said first magnetizing state, the first magnetizing current based on said signal.

17. The method of claim 14, wherein the power converter comprises a second comparator to compare, in the demagnetizing state, the current through the inductor with said pre-determined threshold current value, and wherein the method comprises
interrupting, in the demagnetizing state, the demagnetizing current path based on the comparison.

18. The method of claim 14, comprising
controlling, in a second magnetizing state, the switching elements such that the switching elements establish a second magnetizing current path from a reference potential, via the second flying capacitor, via the inductor, to the output node,
controlling, in said second magnetizing state, the switching elements such that the switching elements interrupt said second magnetizing current path after said pre-determined time interval.

19. The method of claim 18, comprising
controlling, in a third magnetizing state, the switching elements such that the switching elements establish a third magnetizing current path from a reference potential, via the first flying capacitor, via the second flying capacitor, via the inductor, to the output node,
controlling, in said third magnetizing state, the switching elements such that the switching elements interrupt said third magnetizing current path after said pre-determined time interval.

20. The method of claim 19, comprising
switching, after the current through the inductor reaches said pre-determined threshold current value in the demagnetizing state, to an idle state, and
controlling, in said idle state, the switching elements such that no current is flowing through the inductor.

21. The method of claim 20, wherein the power converter comprises a first comparator to compare the output voltage at the output node with a reference voltage, and wherein the method comprises
switching from the idle state to the third magnetizing state based on the comparison.

22. The method of claim 21, wherein the method comprises switching between the different states according to the following ordered state sequence:
the first magnetizing state;
the demagnetizing state;
the second magnetizing state;
the demagnetizing state;
the third magnetizing state;
the demagnetizing state;
the second magnetizing state;
the demagnetizing state.

23. The method of claim 19, wherein the switching elements comprise
a third switching element coupled between a reference potential and a second terminal of the first flying capacitor,
a fourth switching element coupled between a first terminal of the first flying capacitor and first terminal of the second flying capacitor, and
a sixth switching element coupled between a second terminal of the second flying capacitor and a first terminal of the inductor, wherein the method comprises
    establishing, in the third magnetizing state, the third magnetizing current path by closing the third, the fourth and the sixth switching element.

24. The method of claim 18, wherein the switching elements comprise
    a fifth switching element coupled between a first terminal of the second flying capacitor and a first terminal of the inductor, and
    a seventh switching element coupled between a reference potential and a second terminal of the second flying capacitor,
wherein the method comprises
    establishing, in the second magnetizing state, the second magnetizing current path by closing the fifth and the seventh switching element.

25. The method of claim 14, wherein the switching elements comprise
    a first switching element coupled between the input node and a first terminal of the first flying capacitor,
    a second switching element coupled between a second terminal of the first flying capacitor and first terminal of the second flying capacitor, and
    a sixth switching element coupled between a second terminal of the second flying capacitor and a first terminal of the inductor,
wherein the method comprises
    establishing, in the first magnetizing state, the first magnetizing current path by closing the first, the second and the sixth switching element.

26. The method of claim 14, wherein the switching elements comprise
    a sixth switching element coupled between a second terminal of the second flying capacitor and a first terminal of the inductor, and
    a seventh switching element coupled between a second terminal of the second flying capacitor and a reference potential,
wherein the method comprises
    establishing, in the demagnetizing state, the demagnetizing current path by closing the sixth and the seventh switching element.

* * * * *